(12) United States Patent
Ding et al.

(10) Patent No.: US 11,503,860 B2
(45) Date of Patent: Nov. 22, 2022

(54) HEATING ELEMENT AND METHOD FOR FABRICATING THE SAME AND ELECTRONIC ATOMIZER

(71) Applicant: ALD GROUP LIMITED, Shenzhen (CN)

(72) Inventors: Yi Ding, Shenzhen (CN); Hongsheng Cheng, Shenzhen (CN)

(73) Assignee: ALD Group Limited, Shenzhen (CN)

( * ) Notice: Subject to any disclaimer, the term of this patent is extended or adjusted under 35 U.S.C. 154(b) by 128 days.

(21) Appl. No.: 16/910,057

(22) Filed: Jun. 23, 2020

(65) Prior Publication Data

US 2020/0315251 A1    Oct. 8, 2020

Related U.S. Application Data

(63) Continuation-in-part of application No. PCT/CN2018/074404, filed on Jan. 29, 2018.

(30) Foreign Application Priority Data

Dec. 27, 2017  (CN) .......................... 201711447918.0

(51) Int. Cl.
*A24F 40/46* (2020.01)
*A24F 40/70* (2020.01)
(Continued)

(52) U.S. Cl.
CPC .............. *A24F 40/46* (2020.01); *A24F 40/44* (2020.01); *A24F 40/70* (2020.01); *H05B 3/148* (2013.01);
(Continued)

(58) Field of Classification Search
None
See application file for complete search history.

(56) References Cited

U.S. PATENT DOCUMENTS 5,804,797 A * 9/1998 Kaimoto .................. H01C 7/02
219/505
2017/0105453 A1* 4/2017 Li ....................... A61M 15/002
(Continued)

FOREIGN PATENT DOCUMENTS

CN         205285009 U    6/2016
CN         105725281 A    7/2016
(Continued)

*Primary Examiner* — James Harvey
(74) *Attorney, Agent, or Firm* — Robert L. Stearns; Dickinson Wright, PLLC

(57) ABSTRACT

A heating element and method for fabricating the same includes: a heating material piece configured to generate heat when being powered. A first substrate is configured to support the heating material piece and a liquid guiding member is configured to guide an atomizing liquid to be heated. The first substrate is a substrate made of a dense material and the heating material piece is a film with a certain resistance formed by a resistive slurry fixed on a surface of the dense material substrate by at least one selected from printing, coating, soaking and spraying. Two wires are electrically connected to the first substrate to form electrodes that are respectively connected to two ends of the film with a certain resistance. The liquid guiding member is a member made of a microporous material fixed outside the first substrate and the heating material piece.

11 Claims, 3 Drawing Sheets

(51) Int. Cl.
    *A24F 40/44*          (2020.01)
    *H05B 3/14*           (2006.01)
    *A24F 40/10*          (2020.01)

(52) U.S. Cl.
    CPC ........ *A24F 40/10* (2020.01); *H05B 2203/021* (2013.01)

(56) References Cited

U.S. PATENT DOCUMENTS

| | | |
|---|---|---|
| 2017/0105454 A1 | 4/2017 | Li et al. |
| 2018/0153218 A1* | 6/2018 | Verleur .................... H05B 3/44 |
| 2018/0352611 A1* | 12/2018 | Kim ......................... H05B 3/86 |
| 2019/0133186 A1* | 5/2019 | Fraser .................... A24F 40/44 |
| 2020/0315251 A1* | 10/2020 | Ding .................. C04B 41/5133 |

FOREIGN PATENT DOCUMENTS

| | | |
|---|---|---|
| CN | 205585324 U | 9/2016 |
| CN | 107006896 A | 8/2017 |
| CN | 107125806 A | 9/2017 |
| CN | 207784280 U | 8/2018 |

\* cited by examiner

HEATING ELEMENT AND METHOD FOR FABRICATING THE SAME AND ELECTRONIC ATOMIZER

CROSS-REFERENCE TO RELATED APPLICATIONS

The present application is a Continuation-in part application of International Application No. PCT/CN2018/074404, filed on Jan. 29, 2018, and claims the priority of CN patent application No. 2017114479180 filed on Dec. 27, 2017, the entire content of which is incorporated herein by reference.

BACKGROUND

1. Technical Field

The present application relates to the technical field of heating element, and more particularly to a heating element and a method for fabricating the same and an electronic atomizer.

2. Related Art

Electronic atomizers and electronic humidifiers are mainly used to evaporate liquids such as atomizing liquid and water into aerosols or gases, and their main structure is a heating element. The heating elements are mainly divided into three categories:

(1) Traditional heating elements: stainless steel or alloy resistance wire is wound around glass fiber, or resistance wire is cladded with glass fiber and oil-absorbing cotton. Since the glass fiber is easy to produce debris, and liquid absorption amount is small and oil absorption consistency is poor, and although the oil absorption cotton is good in oil absorption, it is very easy to be burnt, which greatly limits its application in electronic atomizers and humidification equipment.

(2) Porous ceramic heating element with resistance wire: the porous ceramic is wound with stainless steel or alloy resistance wire, or the resistance wire sintered in the inner layer of the ceramic. The porous ceramic has a large porosity and a large liquid absorption amount, which can continuously introduce the atomizing liquid/water from the storage liquid cavity to heat and atomize. In the fabricating process, due to the different expansion coefficients of the heating wire and the porous ceramic, it is easy to cause problems such as cracking of the porous ceramic, separation of the heating wire and the porous ceramic, and so on.

3) Porous ceramic heating element with printed heating film: printing a resistance heating film on the surface of the porous ceramic, usually a metal film. On the one hand, the porous ceramic has a large porosity, the resistive slurry is embedded in the ceramic pores when printing the resistance heating film, which greatly reduces the liquid absorption amount; on the other hand, when sintering under high temperature (above 600° C.) in the air atmosphere, the metal film is easily oxidized, and carburization is easy to occur, and the metal film is fragile.

SUMMARY

The present application is directed to solve the problems that the current porous ceramic heating element is easily oxidized, fragile and the liquid absorption amount is reduced during sintering, and provides a new heating element and a method for fabricating the same.

The technical scheme adopted by the present application is to provide a heating element, including: a heating material piece, configured to generate heat when being powered; a first substrate, configured to support the heating material piece; and a liquid guiding member, configured to guide an atomizing liquid to be heated; the first substrate is a substrate made of a dense material; the heating material piece is a film with a certain resistance (0.1Ω-19Ω) formed by a resistive slurry fixed to a surface of the dense material substrate by at least one selected from printing, coating, soaking and spraying, two wires are electrically connected to the first substrate to form electrodes that are respectively connected to two ends of the film with a certain resistance; the liquid guiding member is a member made of a microporous material fixed outside the first substrate and the heating material piece.

In the present application, the heating material piece act as a film with a certain resistance disposed onto the surface of the dense material, and the liquid guiding member made of a microporous material is disposed onto the film with a certain resistance, thereby the problem of reducing the liquid absorption amount caused by the current resistive slurry embedded in the ceramic pores is overcome.

Further, in the above heating element, the first substrate is a dense ceramic body.

Further, the heating element further comprises a second substrate, and the second substrate being a dense ceramic body cladded around the first substrate and the heating material piece, a material of the dense ceramic body is at least one selected from silicon dioxide, aluminum oxide, silicon carbide or silicon nitride.

The second substrate is disposed outside the first substrate and the heating material, and the problem of the metal resistive slurry film being easily oxidized and fragile when sintering at high temperature (above 600° C.) in an air atmosphere is overcome.

Further, in the above heating element, the resistive slurry is mixed slurry selected from one or more of palladium silver slurry, silver nanowire slurry, stainless steel slurry and tungsten slurry.

Further, in the above heating element, the microporous material is a porous ceramic, and the material of the porous ceramic is at least one ceramic material selected from silicon dioxide, aluminum oxide, silicon carbide and silicon nitride.

Further, in the above heating element, the wire of the electrodes is a wire made from nickel, stainless steel or silver.

The present application further provides a method for fabricating a heating element, including steps:

Step A), fabricating a first substrate made of a dense ceramic material mixed by one or more ceramic materials selected from silicon dioxide, aluminum oxide, silicon carbide and silicon nitride;

Step B), forming a film with a certain resistance on the first substrate by a method of thick film printing and using one or more mixed slurry selected from palladium silver slurry, silver nanowire slurry, stainless steel slurry and tungsten slurry;

Step C), fixing electrode wires selected from nickel wire, stainless steel wire or silver wire onto the first substrate by a method of brazing and being in well contact with the film with a certain resistance;

Step D), putting into a high-temperature furnace and holding it at 600-1000° C. for 40-80 minutes;

Step E), then putting into a mold and pressing at least one porous ceramic material selected from silicon dioxide, aluminum oxide, silicon carbide and silicon nitride into the mold;

Step F), putting into a high-temperature furnace again, and holding it at 600-1000° C. for 40-80 minutes.

Further, in the above method for fabricating a heating element, between step C) and step D) further includes:

fabricating a second substrate made of a dense ceramic material according to a shape of the dense ceramic material first substrate, and the second substrate is cladded around the first substrate and the heating material piece.

BRIEF DESCRIPTION OF THE DRAWINGS

The present application will be described in detail below with reference to the following drawings and detailed description of embodiments, in which.

DETAILED DESCRIPTION

Figure 1:
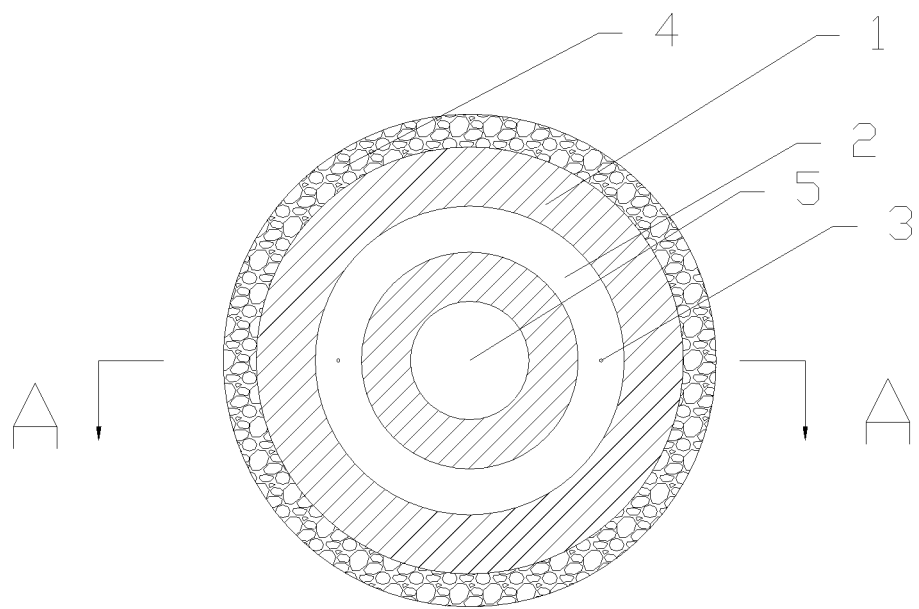
FIG. 1 is a schematic structural view of a bottom cross-sectional view of a heating element according to embodiment 1 of the present application.
Figure 2:
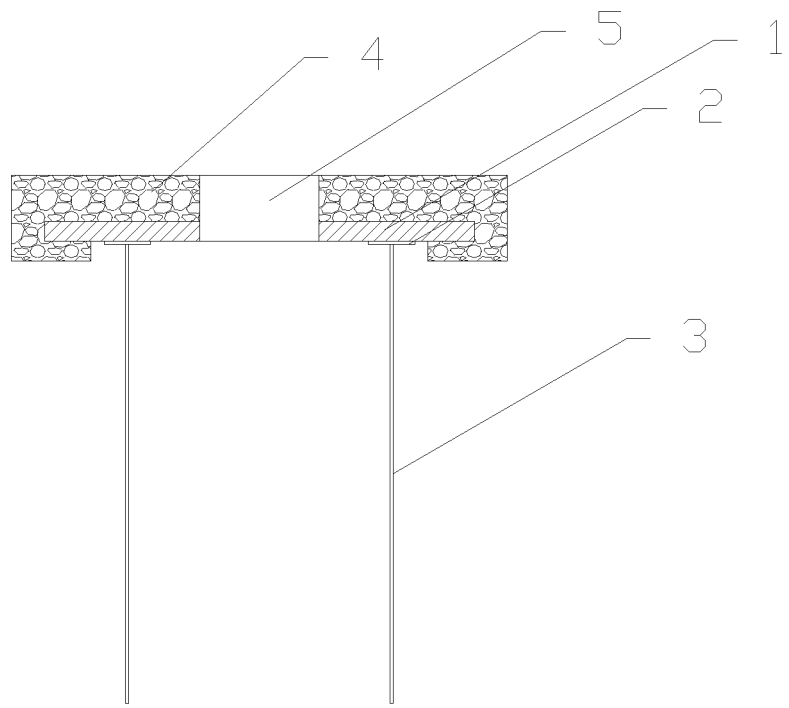
FIG. 2 is a schematic structural view of a half-sectional view of a heating element according to embodiment 1 of the present application.

The present embodiment provides a heating element, and provides a method for fabricating the heating element, as shown in FIGS. 1 and 2 according to a first embodiment. The heating element of the embodiment is a heater used in an electronic atomization device, which is a cylindrical shape heating element. The heating element includes a first substrate 1 in the shape of a cylinder arranged at the center; a film of a heating material piece 2 with a certain resistance (0.1 Ω~19Ω) is provided on the surface of the first substrate 1; two ends of the heating material piece 2 are welded with electrodes 3; the first substrate 1 is also cladded with a layer of liquid guiding member 4 made of microporous materials such as microporous ceramic materials, and the liquid to be atomized, such as the atomizing liquid in the electronic atomization device and water in the humidifier Etc., through the liquid guiding member 4, the atomized liquid/water can be continuously introduced into the heating element and atomized into aerosol/water vapor. In this embodiment, a part of the liquid guiding member 4 is immersed in the atomizing liquid bin of the electronic atomization device, and the atomizing liquid in the atomizing liquid bin can be introduced to the surface of the first substrate 1.

Figure 3:
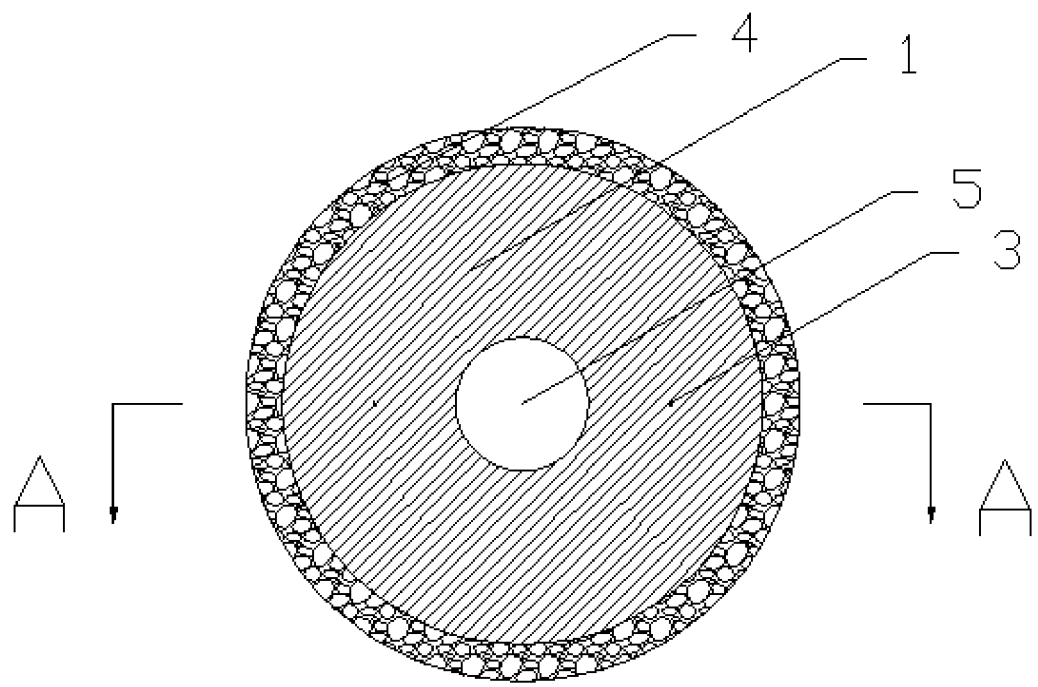
FIG. 3 is a schematic structural view of a bottom cross-sectional view of a heating element according to embodiment 2 of the present application.
Figure 4:
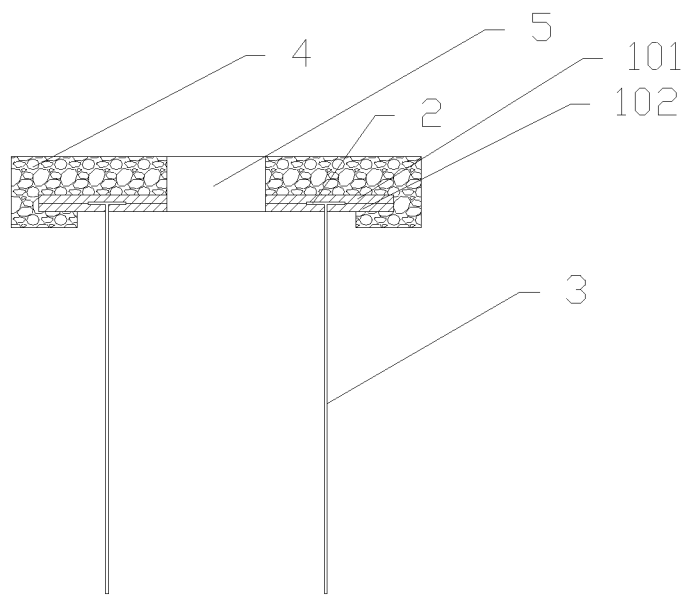
FIG. 4 is a schematic structural view of a half-sectional view of a heating element according to embodiment 2 of the present application.

In a second embodiment, as shown in FIGS. 3 and 4, the heating element of the embodiment can also include a layer of a second substrate 102 which may be placed on the first substrate 101. The second substrate 102 and the first substrate 101 are mutually matched. The film of the heating material piece 2 is located between the first substrate 101 and the second substrate 102. Outside the second substrate 102 is also cladded a layer of liquid guiding member 4 made of microporous material such as microporous ceramic material. The liquid to be atomized, such as the atomizing liquid in the electronic atomization device and water in the humidifier, etc., is guided through the liquid guiding member 4, and in this way the atomized liquid/water can be continuously introduced into the heating element and atomized into aerosol/water vapor. In this embodiment, a part of the liquid guiding member 4 is immersed in the atomizing liquid bin of the electronic atomization device, and the atomizing liquid in the atomizing liquid bin can be introduced to the surface of the second substrate 102.

Since the electrodes 3 are energized at both ends, the heating material piece 2 generates heat and conducts the heat to the second substrate 102 having excellent thermal conductivity, and the atomizing liquid is atomized. In the embodiment, the first substrate and the second substrate are made of a dense ceramic material, the liquid guiding member is made of a microporous ceramic material, and the heating material piece configured to heat is made from resistive slurry. At present, the film formed by the resistive slurry on the PCB board or other planes is generally used for electrical conduction, in the embodiment, a film-shaped resistor of different shapes is formed on the surface of the dense ceramic substrate as needed, and electrodes are welded at both ends to form an electric heater, the film formed by the resistive slurry on the PCB or other planes is no longer just used for electrical conduction (wire), it is still used as a heating material piece onto the surface of the dense ceramic substrate, that is, the electric heater.

In this embodiment, the first substrate 101 and the second substrate 102 are made of dense ceramic materials; and the porosity of the dense ceramic materials are less than or equal to 2%, and larger than 0.8% of volume of the dense ceramic material. In practice, they may be ceramic materials of other shapes, such as at least one of a complete continuous sheet, a sheet with a missing center, and a sheet with a missing edge, a sheet with spiral-shaped, a sheet with square-shaped, a sheet with round-shaped and other partially continuous sheet structure. The material of the dense ceramic body is described as follows: the material of the dense ceramic body is one or a mixture of several selected from silicon dioxide, aluminum oxide, silicon carbide, silicon nitride and other ceramic materials. In practice, the current ceramic production process is very mature and can be made into ceramic bodies of different shapes.

In this embodiment, the heating material piece 2 is made of resistive slurry material that can generate heat after being energized. In the embodiment, the heating material piece 2 is a film with a certain resistance (0.1Ω~19Ω) formed on the surface of the first substrate 1 or 101 by printing or other processes, two wires are welded on the film as electrodes to form a heater. In practice, there are many options for resistive slurry, and there are many mature processes for the fabricating process.

At present, the heating material piece 2 is a film (such as a thick film (2400 nm-24000 nm), a thin film (5 nm-2400 nm), and the like) formed by a resistive slurry fixed on a surface of the dense material substrate by at least one selected from printing, coating, soaking and spraying. The fixed shape of the heating material piece 2 is at least one selected from an S shape, a linear shape, a broken line shape, a wave shape, a zigzag shape, a spiral shape, a circular shape, a square shape, and other shapes. The raw material of the heating material piece 2 is resistive slurry, that is, one or a mixture resistive slurry selected form palladium silver slurry, silver nanowire slurry, stainless steel slurry, and tungsten slurry. The electrode material is at least one conductive material selected from nickel, stainless steel, and silver. The shape of the electrodes is at least one of a filament, a sheet, or a cylinder. The electrode material is fixed on the dense ceramic and combined with the heating material piece 2. In practice, the resistance between the two electrodes can be adjusted to 0.1 to 19 ohms by adjusting the shape of the film and the ratio of the slurry.

In the embodiment, the heating material piece, which is silver nanowires resistive slurry film, and two wires are drawn out from two ends of the silver nanowire to form the electrodes 3; the silver nanowire and the substrate material are fixed in different combinations together. The silver nanowire resistive slurry film is used as the heating material piece, and the dense ceramic material is used as the substrate material. The silver nanowire and the dense ceramic material are fixed together by at least one process selected form printing, doctoring, spraying, mixing and other processes. This heating element can be used to heat tobacco and tobacco slurry. In combination with other oil-absorbing materials, such as cotton, non-woven fabrics, and porous materials, it can be used to heat atomizing liquid.

In the embodiment, the material used for liquid guiding member 4 is a microporous ceramic material in which liquids such as atomizing liquid and water can be guided, and the porous ceramic member and the dense ceramic body are fixed together in the method of sintering or inlaying. The porous ceramic material is at least one selected from silicon dioxide, aluminium oxide, silicon carbide, silicon nitride, and other ceramic materials. The structure of the porous ceramic member is a sphere, a cuboid, a cylinder, a complete continuous sheet, a sheet with a missing center, and a sheet with a missing edge, a sheet with spiral-shaped, a sheet with square-shaped, a sheet with round-shaped and other partially continuous sheet structure.

The fabricating process of the heating element of an electronic atomizer of the embodiment is as follows:

S1), fabricating a first substrate made of a dense ceramic material mixed by one or more ceramic materials selected from silicon dioxide, aluminum oxide, silicon carbide and silicon nitride;

S2), forming a film with a certain resistance on the first substrate by a method of thick film printing and using one or more mixed slurry selected from palladium silver slurry, silver nanowire slurry, stainless steel slurry and tungsten slurry; in the embodiment, the film is formed on the first substrate by a method of printing and using palladium silver slurry.

S3), fixing electrode wires selected from nickel wire, stainless steel wire or silver wire onto the first substrate by a method of brazing, in the embodiment, nickel wire, stainless steel wire or silver wire is in well contact with two ends of the film resistance fixed on the surface of the first substrate, as well as electrodes.

S5), putting into a high-temperature furnace and holding it at 600-1000° C. for 40-80 minutes. In this embodiment, the temperature may be kept at about 800° C. for 1 hour. In addition, the higher the temperature is, the longer the keeping time can be. In practice, the temperature can be grasped.

S6), then putting into a mold and pressing at least one porous ceramic material selected from silicon dioxide, aluminum oxide, silicon carbide and silicon nitride into the mold. In this embodiment, the aluminum oxide is selected as raw material of the porous ceramic.

S7), putting into a high-temperature furnace again. In this embodiment, the temperature may be kept at about 800° C. for 1 hour. In addition, the higher the temperature is, the longer the keeping time can be. In practice, the temperature can be grasped to fabricate a heating element. In this heating element, the porous ceramic member on the surface can be used to introduce the atomizing liquid for atomizing.

Embodiment 2, this embodiment is a heating body used in a humidifier and a method fabricating the same. As shown in FIG. 2, the heating element of this embodiment includes a first substrate 1 having a ceramic sheet, a film formed on the first substrate by a printing process as a heating material piece 2, and a resistive slurry is printed onto the first substrate 1, afterwards, a layer of microporous ceramic is used to form the liquid guiding member.

The fabricating method of this embodiment is as follows:

S21). Fabricating dense ceramic sheet as the first substrate using silicon dioxide;

S22). Forming a resistive film on the surface of the dense ceramic sheet by a method of thick film printing using palladium silver slurry;

S23). Fixing electrode wires made of nickel wire onto the dense ceramic sheet by a method of brazing and being in well contact with two ends of the film;

S24). Putting into a mold and pressing dense ceramic material made of silicon dioxide into the mold;

S25). putting into a high-temperature furnace and holding it at 800° C. for 1 hour;

S26). Putting into a mold and pressing porous ceramic material made of silicon dioxide into the mold;

S27). putting into a high-temperature furnace again, and holding it at 800° C. for 1 hour.

The heating element is formed as shown in FIG. 2 when it is released.

Figure 5:
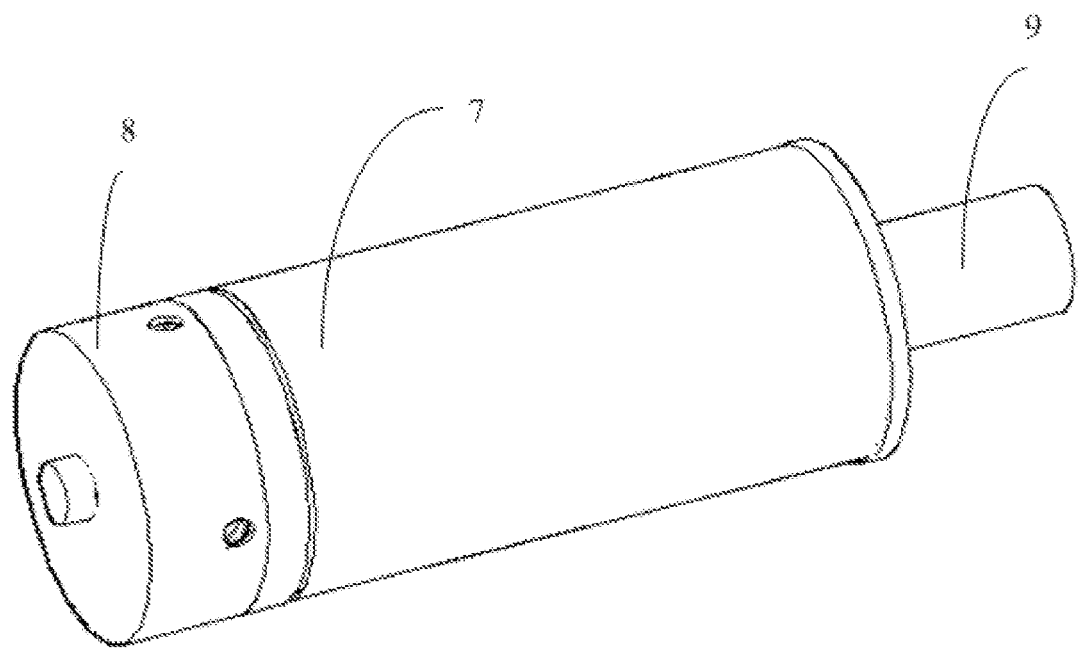
FIG. 5 is a structural view of an electronic atomizer according to an embodiment of the present application.

In an embodiment of the present application, as shown in FIG. 5, an electronic atomizer is further provided, which includes a storage device 7 configured to store the atomizing liquid, and a heating device including the heating element and configured to heat the atomizing liquid. The heating device includes a heating element fabricated by the foregoing method (the heating element is provided inside the storage device, not shown in the FIG. 5), a support base 8 supporting the heating element, and a nozzle portion 9 connected to an air tube.

The storage device 7 includes a liquid storage bin configured to store the atomizing liquid, and an upper surface of the liquid guiding member is in contact with the atomizing liquid in the liquid storage bin. The heating element includes the aforementioned heating material piece 2 configured to generate heating when powered, a first substrate 1 supporting the heating material piece 2, a liquid guiding member 4 that guides the atomizing liquid to be heated, and electrodes 3 formed by two connecting wires electrically connected to the first substrate 1. The heating element is also provided with a through hole 5 for the air tube to pass through.

The heating material piece is a film with a certain resistance formed by resistive slurry fixed on a surface of the dense material substrate by at least one selected from printing, coating, soaking and spraying. The liquid guiding member 4 is a member made of a microporous material fixed outside the first substrate 1 and the heating material piece 2.

Among then, the first substrate 1 is a dense ceramic body.

In another embodiment, as shown in FIG. 4, the heating element further includes a second substrate 102 located outside the first substrate 101, the second substrate 102 being a dense ceramic body cladded around the first substrate 101 and the heating material piece 2.

In the present application, the heating element is composed of the first substrate 101 made of dense ceramic, the heating material piece 2 of the resistive slurry film, the second substrate 102 made of dense ceramic, and the liquid guiding member 4 made of porous ceramic. The problem that the metal resistive slurry film is easy to be oxidized and brittle is avoided when the porous ceramic is calcined and sintered in the air atmosphere, and the resistive slurry film is printed on the dense ceramic instead of the porous ceramic to avoid the resistive slurry blocking the ceramic pores and affecting the oil absorption amount.

In addition, in the embodiment, the heating device is accommodated in the storage device; and the storage device includes a microporous material member having micropores storing atomizing liquid therein. The volume of the microporous voids in the microporous material accounts for 30-60% of a volume of the entire microporous material member. Because the microporous material member is used to store the atomizable liquid, especially the atomizing liquid, which is stored in the microporous material member through the principle of capillary and siphon. During normal use, transportation and storage, it will not cause liquid leakage and the sealing structure of the atomization device is simple.

The heating element samples of embodiment 1 and embodiment 2 were taken and tested for the following indexes:

(1) Appearance: taking the sample of embodiment 1 to peel off the porous ceramic layer, taking the sample of embodiment 2 to peel off the porous ceramic layer and the second dense ceramic layer, then visually observing the color of the resistive slurry film, the color is obviously black or scorched, that is, judged as oxidation, carburization.

(2) Resistance: testing the resistance value with a resistance meter.

(3) Degree of bonding: taking the sample of embodiment 1 to peel off the porous ceramic layer, taking the sample of embodiment 2 to peel off the porous ceramic layer and the second dense ceramic layer, and then sticking with high-temperature adhesive paper for 5 times, visually observing whether there is any peeling.

(4) Anti-scratch performance of nails: taking the sample of embodiment 1 to peel off the porous ceramic layer, taking the sample of embodiment 2 to peel off the porous ceramic layer and the second dense ceramic layer, after scratching with nails for 1000 times, testing the difference of the resistance value at room temperature before and after scratching.

(5) Anti-scratch performance of HB pencil: taking the sample of embodiment 1 to peel off the porous ceramic layer, taking the sample of embodiment 2 to peel off the porous ceramic layer and the second dense ceramic layer, after scratching with HB pencil for 1000 times, testing the difference of the resistance value at room temperature before and after scratching.

(6) Porosity: respectively testing the dry weight, wet weight and floating weight of porous ceramics by the Archimedes principle, and then calculating the porosity.

TABLE 1 shows test results of embodiment samples

| | | | | | Anti-scratch performance of nails | | Anti-scratch performance of HB pencil | |
| --- | --- | --- | --- | --- | --- | --- | --- | --- |
| embodiment | Porosity | Appearance | Resistance/ $\Omega$ | Degree of bonding | resistance value before scratching/ $\Omega$ | resistance value after scratching/ $\Omega$ | resistance value before scratching/ $\Omega$ | resistance value after scratching/ $\Omega$ |
| embodiment1 | 55% | black | 1.5 | resistance slurry peeling off | 1.5 | 1.8 | 1.5 | 2 |
| embodiment2 | 55% | natural | 1.1 | no resistance slurry peeling off | 1.1 | 1.1 | 1.1 | 1.1 |

It is not difficult to see from the data in table 1 that although there is no difference in the porosity of the heating element of the samples in embodiment 1 and embodiment 2 (that is, there is no difference in oil absorption amount), the sample of embodiment 1 does not have a second dense ceramic layer (the second substrate 102), and its resistive slurry film is oxidized and carburized, which leads to a decrease in its degree of bonding and anti-scratch performance.

What is claimed is:
1. A heating element, comprising:
a heating material piece, configured to generate heat when being powered;
a first substrate, configured to support the heating material piece; and
a liquid guiding member, configured to guide an atomizing liquid to be heated;
wherein the first substrate is a substrate made of a dense material;
the heating material piece is a film with a certain resistance formed by a resistive slurry fixed to a surface of the dense material substrate by at least one selected from printing, coating, soaking and spraying;
two wires are electrically connected to the first substrate to form electrodes that are respectively connected to two ends of the film with a certain resistance; and
the liquid guiding member is a member made of a microporous material fixed outside the first substrate and the heating material piece;
wherein the first substrate is a dense ceramic body; and
wherein a second substrate comprising a dense ceramic body cladded around the first substrate and the heating material piece.
2. The heating element of claim 1, wherein a material of the dense ceramic body is at least one selected from silicon dioxide, aluminum oxide, silicon carbide or silicon nitride.

3. The heating element of claim 1, wherein the resistive slurry is one or mixed slurry selected from palladium silver slurry, silver nanowire slurry, stainless steel slurry and tungsten slurry.

4. The heating element of claim 1, wherein the microporous material is a porous ceramic, and a material of the porous ceramic is at least one ceramic material selected from silicon dioxide, aluminum oxide, silicon carbide and silicon nitride.

5. The heating element of claim 4, wherein a volume of the microporous voids in the microporous material accounts for 30-60% of a volume of the entire microporous material.

6. The heating element of claim 4, wherein the wire of the electrodes is a wire made from nickel, stainless steel or silver.

7. The heating element of claim 1, wherein the heating material piece is a silver nanowire resistive film, and two wires are drawn out from two ends of the silver nanowire resistive film to form the electrodes.

8. An electronic atomizer, comprising:
a storage device, configured to store an atomizing liquid; and
a heating device, comprising a heating element and configured to heat and atomize the atomizing liquid;
wherein, the heating element comprises:
a heating material piece, configured to generate heat when being powered;
a first substrate, configured to support the heating material piece; and
a liquid guiding member, configured to guide an atomizing liquid to be heated;
wherein the first substrate is a substrate made of a dense material; the heating material piece is a film with a certain resistance formed by a resistive slurry fixed to a surface of the dense material substrate by at least one selected from printing, coating, soaking and spraying, two wires are electrically connected to the first substrate to form electrodes that are respectively connected to two ends of the film with a certain resistance; the liquid guiding member is a member made of a microporous material fixed outside the first substrate and the heating material piece; and
wherein the electronic atomizer further comprises a second substrate, and the second substrate being a dense ceramic body cladded around the first substrate and the heating material piece.

9. The electronic atomizer of claim 8, wherein the first substrate is a dense ceramic body.

10. The electronic atomizer of claim 8, wherein the storage device comprises a liquid storage bin configured to store atomizing liquid, and an upper surface of the liquid guiding member is in contact with the atomizing liquid in the liquid storage bin.

11. The electronic atomizer of claim 8, wherein a volume of the microporous voids in the microporous material accounts for 30-60% of a volume of the entire microporous material.

* * * * *